United States Patent [19]

Izume

[11] Patent Number: 4,910,375

[45] Date of Patent: Mar. 20, 1990

[54] INVERTER-TYPE RESISTANCE WELDING MACHINE

[75] Inventor: Takatomo Izume, Urawa, Japan

[73] Assignee: Kabushiki Kasha Toshiba, Japan

[21] Appl. No.: 94,892

[22] Filed: Sep. 10, 1987

[30] Foreign Application Priority Data

Sep. 18, 1986 [JP] Japan .................................. 61-217921

[51] Int. Cl.⁴ ............................................. B23K 11/24
[52] U.S. Cl. .................................................... 219/110
[58] Field of Search ...................... 219/110; 363/37, 89

[56] References Cited

U.S. PATENT DOCUMENTS 4,104,724 8/1988 Dix et al. .............................. 219/110

FOREIGN PATENT DOCUMENTS 59-39484 3/1984 Japan .................................. 219/110

Primary Examiner—Clifford C. Shaw
Attorney, Agent, or Firm—Banner, Birch, McKie & Beckett

[57] ABSTRACT

The present invention is directed to an inverter-type resistance welding machine. A PWM inverter supplies high frequency primary voltage to a transformer. A microprocessor controls the PWM inverter by proportional-integral-deviation (PID) control through a PWM control unit. The microprocessor determines a feedforward operation amount which corresponds to a desired welding current value before current is supplied to the welding electrodes. The time period for the calculation of an integral operation amount is effectively reduced to approximately zero by employing a calculated integral operation amount from a previous sampling.

10 Claims, 4 Drawing Sheets

INVERTER-TYPE RESISTANCE WELDING MACHINE

BACKGROUND OF THE INVENTION

1. Field of the Invention

This invention relates to an inverter-type resistance welding machine which operates from a high frequency power source. The invention also encompasses a control system and method for the welding machine.

2. Description of the Related Art

In a conventional resistance welding machine, a 50 Hz or 60 Hz alternating current (AC) commercial power source is supplied to the welder through a welding transformer. The level of current flow through the welder electrodes, i.e., weld current, is controlled by phase control of a thyristor with associated control circuitry. Phase control is the process of rapid ON-OFF switching which connects an AC supply to a load for a controlled fraction of each cycle. Thus, the duty cycle of the supply is controlled. Control is accomplished by governing the phase angle of the AC wave at which the thyristor is triggered. The thyristor then conducts for the remainder of the cycle.

The use of a relatively low frequency power source (e.g., 50 Hz or 60 Hz) requires a rather large welding transformer in order to provide the requisite weld current. A large transformer necessarily results in a welding machine which is correspondingly larger in size and heavier in weight. In order to reduce the size of the transformer and effect a reduction in the size and weight of the welding machine, one solution is to use a power source having a relatively high frequency, e.g., in the range of 400 Hz to 800 Hz.

The higher frequency power source permits the use of a smaller transformer without sacrificing the amount of weld current which can be delivered to the welding electrodes. Though a higher frequency power source eliminates one problem (the need for a large transformer), it leads to problems in other areas. One such problem has to do with the relatively short period of each cycle of AC voltage due to the higher frequency. The short period of each cycle makes it difficult to provide the necessary phase control over the thyristor because there is insufficient time to consider all of the necessary welding parameters and provide the appropriate phase control response. This problem is especially critical where a microprocessor is used to provide the control function. Accordingly, there is a tendency to refrain from using higher frequency power sources for this reason, the result being that larger size welding transformers are necessary.

SUMMARY OF THE INVENTION

It is, therefor, an object of the present invention to provide a resistance welding machine which can be operated from a high frequency power source which overcomes the problems associated with such machines which are known in the prior art.

It is another object of the present invention to provide a resistance welding machine in which weld current can be adequately controlled without regard to the frequency of the power source.

It is a still further object of the present invention to provide a resistance welding machine which can be operated from a high frequency power source which uses a microprocessor to control weld current.

It is another object of the present invention to provide an inverter-type resistance welding machine and a control system and a method therefor which controls weld current by a half-cycle response with respect to inverter frequency.

These and other objects of the present invention are achieved by providing phase control of the inverter where a feed forward operation amount is calculated prior to providing an electric current to the weld electrodes. In addition, an integral operation amount is based on a previously calculated value which in effect reduces its present calculation time to zero. Since calculation of the integral operation amount normally consumes a relatively large amount of time, use of a previously calculated value greatly reduces the time period required to provide the proper phase control for the inverter. Thus, a higher frequency power source can be used along with a correspondingly smaller welding transformer. In addition, the welding machine of the present invention is not prone to generating current which can cause deflecting magnetism of the welding transformer and also prevents abnormally high current flow in the inverter.

The novel features which are considered as characteristic for this invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
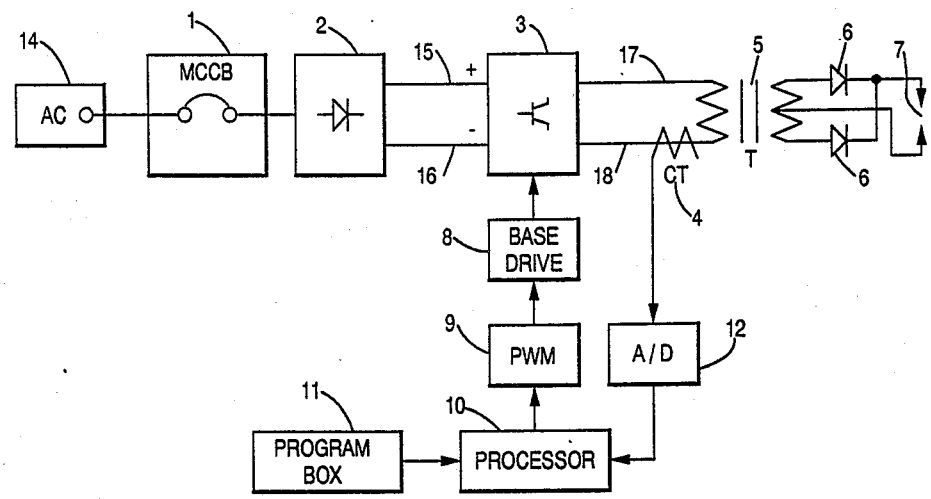
FIG. 1 is a block diagram showing an embodiment of the present invention.
Figure 3:
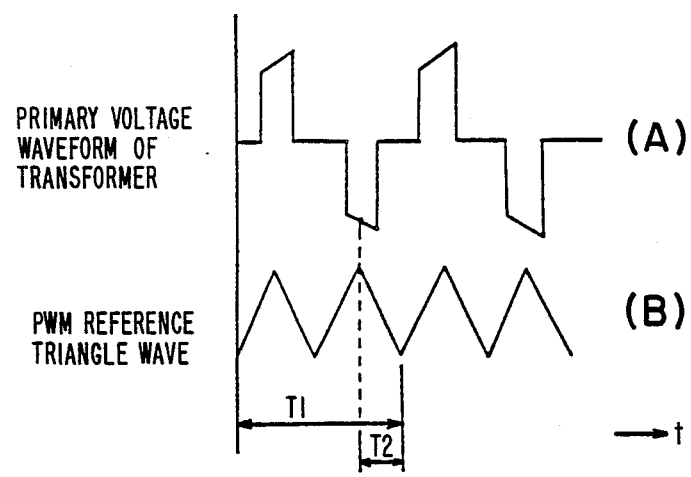
FIG. 3 illustrates the voltage waveforms at various points in the weld current control system of the present invention showing the relationship between the voltage across the primary of the welding transformer and the pulse width modulation reference voltage.

FIG. 1 illustrates one embodiment of the present invention. As shown, an alternating current power source 14 is supplied to rectifier 2 through fused switch 1. Rectifier 2 rectifies the AC power supply voltage to a unipolar voltage which is supplied to GTR power inverter 3 on positive line 15 and negative line 16. Inverter 3 is a thyristor which has its gate controlled by base drive control circuit 8, the operation of which will be described below. The voltage waveform at the output of inverter 3 is shown in FIG. 3A and is connected to the primary winding of transformer 5 by lines 17 and 18. The voltage appearing at the secondary of transformer 5 is full-wave rectified by diodes 6 and is supplied to resistance welding electrodes 7.

Pulse width modulator (PWM) 9 provides phase control for inverter 3 through base drive control 8 such that the duty cycle of the voltage waveform at the inverter's output can be varied. Since the level of weld current flow through welding electrodes 7 is dependent on the duty cycle of the voltage at the output of inverter 3, PWM 9 can effectively control weld current flow. The waveform of the control signal from PWM 9 which is supplied to inverter 3 is shown in FIG. 3B.

The operation of base drive control 8 is controlled by pulse width modulator (PWM) 9 which is in turn controlled by processor 10. As shall be discussed in more detail below, processor 10 controls the operation of PWM 9 in accordance with a stored computer program and data received from current transformer 4 through A/D converter 12 and commands from program box 11. The purpose of current transformer 4 is to detect the level of current flow through the primary of transformer 5. This level is converted to a digital value by A/D converter 12 which is then supplied to processor 10.

Program box 11 allows the user to preset certain welding conditions in advance such as weld current, weld current duration and the like.

Figure 6:
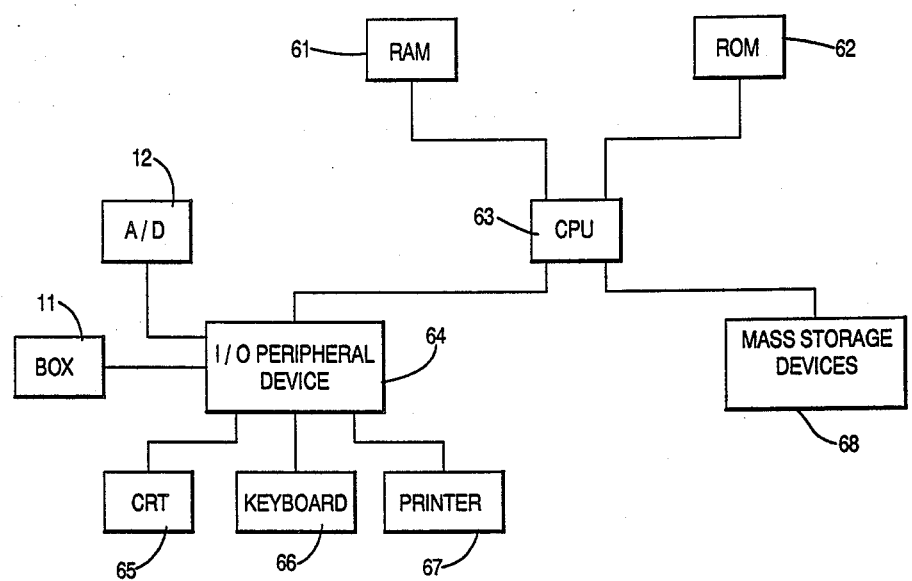
FIG. 6 is a block diagram of the processor used in the weld current control system of the present invention.

FIG. 6 is a block diagram illustrating one construction of processor 10. As FIG. 6 shows, processor 10 includes a number of conventional interrelated elements such as RAM memory 61 and ROM memory 62 where instructions and temporary data storage areas of a computer program reside. Processor 10 also includes input-/output (I/O) peripheral device 64 which allow processor 10 to communicate with program box 11 and A/D converter 12. Peripheral device 64 may also be used to permit the user to communicate with processor 10 through such devices as CRT 65, keyboard 66, and printer 67. The system may also include mass storage devices 68 which allows the system to store data to and receive programming instructions from such peripheral devices as magnetic floppy disks and tape units.

The heart of processor 10 is central processing unit (CPU) 63 which supervises the flow of information between the various elements of the system and which perform logic calculations and other functions based on instructions in the computer program stored in RAM 61 and/or ROM 62 and data associated with the program. CPU 63 may be selected from a number of microprocessors which are known in the art, including 4-bit, 8-bit, 16-bit or 32-bit types.

The construction of processor 10 as shown in FIG. 6 is merely one embodiment. Other embodiments and arrangements may be used including those which do not have CRT, keyboard and printer capabilities.

With reference to FIG. 3 again, time period T1 corresponds to one complete cycle of the voltage appearing at the output of inverter 3 and two complete cycles of the reference triangle wave control signal appearing at the output of PWM 9. In the case where the frequence of AC power source 14 is 700 Hz, the frequency of the voltage at the output of inverter 3 is also 700 Hz. Thus, the period of time T1 is approximately 1.43 ms and the period of time T2 is approximately 0.36 ms.

In the case where processor 10 uses an 8-bit microprocessor for CPU 63 operating at a clock frequency of 2.0 MHz for example, the total calculation time needed to determine the phase control of inverter 3 is approximately 0.5 ms. Since 0.5 ms exceeds the duration of time T2, conventional microprocessor control methods can not be used at this frequency. However, the present invention over comes this problem.

The operation of the welding machine of applicant's invention will now be described in more detail with reference to the control block diagram shown in FIG. 2. This block diagram illustrates one cycle of operation of PWM 9 as controlled by processor 10. As pointed out at the outset, an important factor in a resistance welder is control of the amount of weld current which flows through the welding electrodes.

Figure 2:
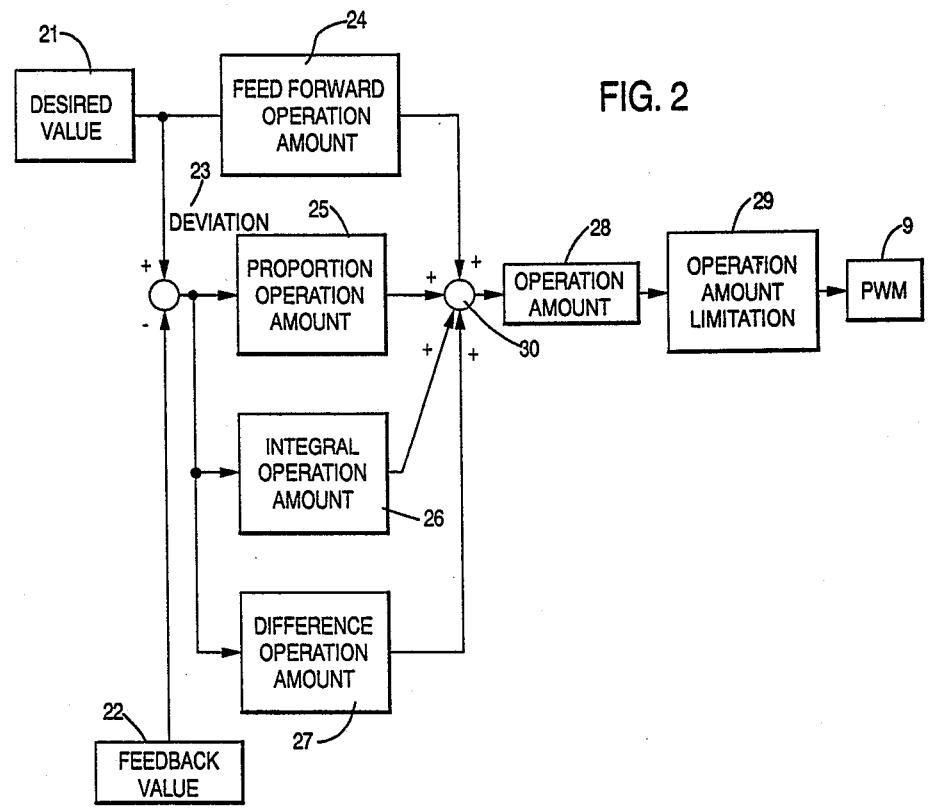
FIG. 2 is a control block diagram which illustrates the operation of the present invention.

In block 21 of FIG. 2, a desired weld current value is selected by the user via program box 11. The selected weld current value is supplied to feed forward operation amount block 24 and to deviation block 23. A feedback amount value from block 22 is also supplied to deviation block 23. This value corresponds to the actual weld current then flowing through welding electrodes 7 and is provided by current transformer 4 and A/D converter 12. Current transformer 4 detects the level of current flowing through the primary of transformer 5 and generates a corresponding analogue signal. Since the level of current flow through the secondary of transformer 5, and thus welding electrodes 7, is dependent on the level of current flowing through the primary of transformer 5, the analogue signal from current transformer 4 accurately reflexes the level of weld current flowing through welding electrodes 7. The analogue signal is converted to a corresponding digital signal by A/D converter 12 which is thus the feedback amount value supplied to deviation block 23 from block 22.

The desired weld current value and the feedback amount operation value are compared by deviation block 23 which provides a difference amount value which is the difference between the desired weld current value and the feedback amount value. The difference amount value is provided to proportional operation amount block 25, integral operation amount block 26 and difference operation amount block 27.

Based on the difference value, a proportional operation amount, an integral operation amount and a difference operation amount are determined and then summed in block 30 to an operation amount as illustrated in block 28. The operation amount is limited by an operation amount limitation value as illustrated in block 29 in order to prevent direct current deflecting magnetism of the transformer 5. This value is then provided as an input to PWM 9 which in turn controls the phase of inverter 3 accordingly.

Figure 4:
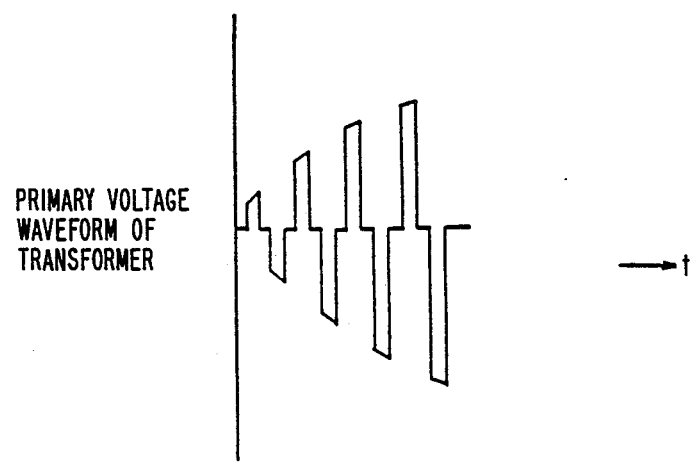
FIG. 4 illustrates the waveform for the desired voltage across the primary of the welding machine transformer.
Figure 5:
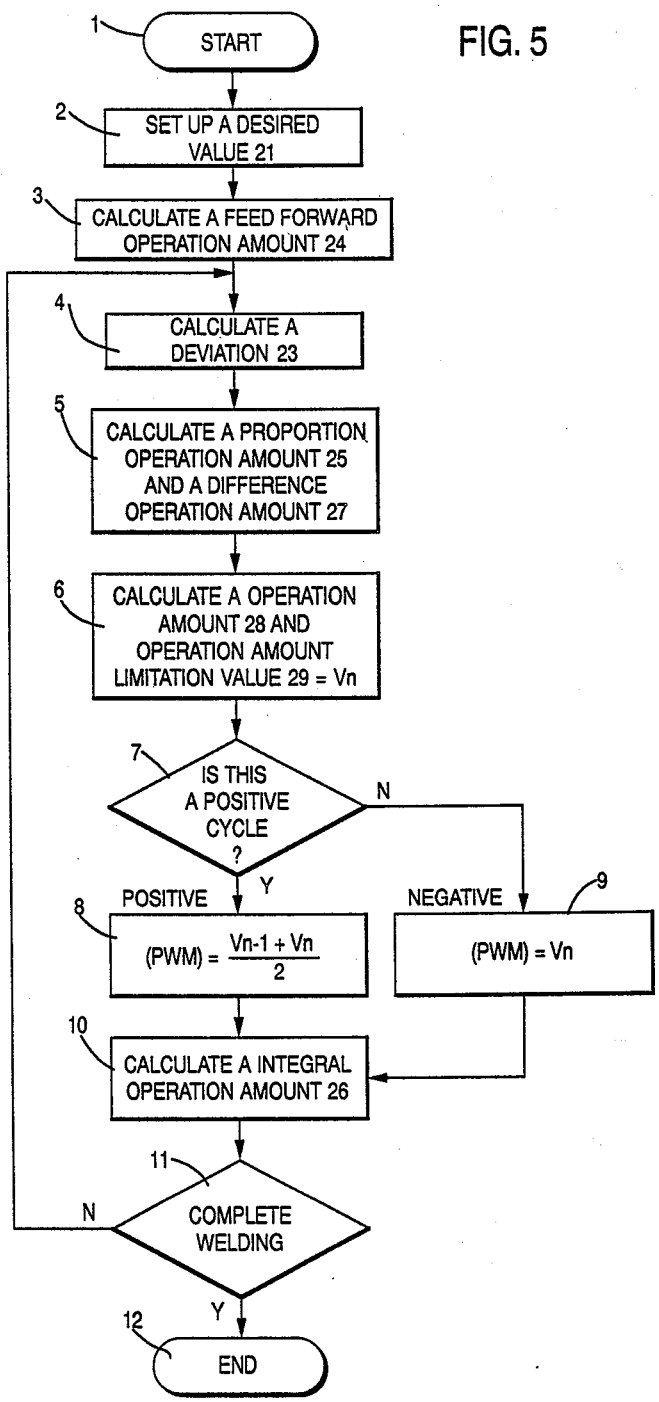
FIG. 5 is a flow chart illustrating the operation of the CPU in the weld current control system of the present invention.

As illustrated in FIG. 4, the operation mount limitation value shown in block 29 should changed in small steps during each positive and negative half cycle to prevent direct current deflecting magnetism of transformer 5. As pointed out above, however, a conventional microprocessor controlled welding machine operating in the conventional fashion does not have sufficient response time to provide the necessary small step control. The present invention overcomes this problem as shall be explained with reference to FIG. 5. FIG. 5 is a flow chart illustration the operation of processor 10.

As shown in FIG. 5, a desired value 21 is established in step 2 and a feed forward operation amount 24 is determined non-selectively in step 3. Operational amount 24 is determined only once prior to electric current being supplied to weld electrodes 7. The feed forward operation amount value need not be determined for every cycle. A deviation valued 23 is then calculated in step 4, a proportional operation amount 25 and a differential operation amount 27 are calculated in step 5. Feed forward operation amount 24 and a previously calculated integral amount 26 are then added to proportional operation amount 25 and differential operation amount 27 in order to obtain operational amount 28 and an operational amount limitation value 29 as shown in block 6. Operational amount limitation value 29 is set as value Vn.

In block 7, a determination is made whether the output waveform of inverter 3 is positive or negative. If negative, PWM 9 is set to the value Vn. If possible, however, PWM 9 is set to the value:

$$\frac{Vn - 1 + Vn}{2}$$

where Vn−1 is a previous value of Vn. In step 10, an integral operation amount 26 for this cycle is calculated and stored for use during later cycles. Phase control of inverter 3 is thus achieved by repeating steps 4–10 until the welding process is completed. Using this process, a prior integral operation amount 26 is used and calculation of a new integral operation amount 26 is delayed until after a phase control value is provided to PWM 9. Since calculation of integral operation amount 26 is rather time consuming, use of the prior calculated amount greatly reduces the time required to provide the proper phase control for inverter 3. Thus, proper phase control can be provided within time period T2 mentioned above.

Integral operation amount 26 is necessary in order to provide an offset of deviation amount 23 between the desired valve 21 and the feedback value 22. Therefore, integral operation amount 26 has no influence on phase control responses even it is delayed one sampling.

Because the output of the positive cycle from inverter 3 is given as:

$$\frac{Vn - 1 + Vn}{2}$$

the voltage waveform is changed in very small steps as shown in FIG. 4.

Obviously, many modifications and variations of the above described preferred embodiment will become apparent to those skilled in the art from a reading of this disclosure. It should be realized that the invention is not limited to the particular apparatus disclosed, but its scope is intended to be governed only by the scope of the appended claims.

I claim:

1. An inverter-type resistance welding machine comprising:
    power supply control means adapted to be coupled to a source of AC power for providing a controlled welding current flow;
    welding electrodes coupled to said power control means for receiving said controlled current flow;
    control means coupled to said power supply control means for controlling the operation of said power supply control means, said control means including calculating means for repetitively calculating a proportion value of welding current flow, an integral value of welding current flow and a difference value of welding current flow in controlling the operation of said power control means, wherein a feedforward operation value of welding current flow is determined in accordance with a previous calculation of said integral value, said feedforward operation value of welding current flow being supplied to said welding electrodes.

2. The welding machine of claim 1 further including rectifier means for rectifying said AC power for application to said power supply control means.

3. The welding machine of claim 1 further including a transformer connected between said power supply control means and said welding electrodes.

4. The welding machine of claim 3 further including rectifier means for rectifying the output of said transformer to provide said weld current to said welding electrodes.

5. The welding machine of claim 1 wherein said power supply control means includes a PWM controller for controlling said welding current flow.

6. The welding machine of claim 5 wherein said PWM controller is controlled by a processor.

7. The welding machine of claim 1, wherein an arithmetic means of a previous operation amount and a present operation amount during the positive half cycle of said power source control means is output to said PWM control circuit and said present operation amount during the negative half cycle of said power source control means is output to said PWM control circuit.

8. The welding machine of claim 1 wherein control means limits said operation amount to a predetermined value.

9. The welding machine of claim 6 wherein said processor is an 8-bit micro-computer.

10. A method of controlling a welding machine, said method including the steps of;
    providing power supply control means adapted to be coupled to a source of AC power for providing a controlled welding current flow;
    providing control means coupled to said power supply control means for controlling the operation of said power control means, said control means repetitively calculates a proportion value of welding current flow, an integral value of welding current flow and a difference value of welding current flow in controlling the operation of said power control means, wherein a feedforward operation value of welding current flow corresponding to a desired value of welding current flow is determined in accordance with a previous calculation of said integral value, said feedforward operation value of welding current flow being supplied to said welding electrodes.

* * * * *